(12) United States Patent
Kehrer

(10) Patent No.: US 7,566,136 B2
(45) Date of Patent: Jul. 28, 2009

(54) DEVICE FOR CONVEYING A MOTION PICTURE FILM

(75) Inventor: Klemens Kehrer, Vienna (AT)

(73) Assignee: Arnold & Richter Cine Technik GmbH & Co., Betriebs KB (DE)

( * ) Notice: Subject to any disclaimer, the term of this patent is extended or adjusted under 35 U.S.C. 154(b) by 762 days.

(21) Appl. No.: 10/561,109

(22) PCT Filed: Jun. 17, 2004

(86) PCT No.: PCT/DE2004/001281

§ 371 (c)(1),
(2), (4) Date: Dec. 15, 2005

(87) PCT Pub. No.: WO2004/114012

PCT Pub. Date: Dec. 29, 2004

(65) Prior Publication Data

US 2006/0146286 A1 Jul. 6, 2006

(30) Foreign Application Priority Data

Jun. 17, 2003 (DE) .............................. 103 27 771

(51) Int. Cl.
G03B 1/14 (2006.01)
(52) U.S. Cl. ..................... 353/168; 226/110; 352/184
(58) Field of Classification Search ................ 352/166, 352/168, 191; 226/62–73, 110
See application file for complete search history.

(56) References Cited

U.S. PATENT DOCUMENTS 3,907,413 A 9/1975 Morell et al.

4,778,093 A 10/1988 Renold (Continued)

FOREIGN PATENT DOCUMENTS

DE 690 24 048 T2 11/1990

(Continued)

OTHER PUBLICATIONS

English translation of the IPER for International Patent Application No. PCT/DE2004/001281, dated Jun. 17, 2004, in the name of Arnold & Richter Cine Technik Gmbh & Co. Betriebs KG.

(Continued)

Primary Examiner—William C. Dowling
(74) Attorney, Agent, or Firm—Christie, Parker & Hale, LLP

(57) ABSTRACT

A device for conveying a motion picture film has at least one uniformly distributed row of perforations. An unwinding toothed reel, which continuously unwinds the motion picture film from a film supply reel, a winding toothed reel that continuously winds the motion picture film onto a film winding reel, and a film feeding mechanism, which intermittently conveys the motion picture film, engage inside said perforations. In order to switch the film conveyance from three to four perforation holes per film frame, the rotational speed of the film conveying motor connected to the winding toothed reel and to the unwinding toothed reel, is increased by 4:3, whereas the multiplication of the film feeding mechanism, of the movement gearing or of a movement gearing element can be altered by three or four perforation holes per film frame in order to adapt to the conveyance of the motion picture film.

13 Claims, 5 Drawing Sheets

U.S. PATENT DOCUMENTS

| | | | |
|---|---|---|---|
| 4,900,293 A | | 2/1990 | McLendon |
| 5,225,860 A | | 7/1993 | Blaschek |
| 5,312,304 A | * | 5/1994 | Vetter .................. 474/160 |
| 6,019,473 A | * | 2/2000 | Goodhill et al. ............ 352/180 |
| 7,367,676 B2 | * | 5/2008 | Trauninger ................ 352/166 |
| 2003/0048419 A1 | * | 3/2003 | Goodhill et al. ............ 352/166 |
| 2008/0036968 A1 | * | 2/2008 | Trauninger ................ 352/191 |

FOREIGN PATENT DOCUMENTS

DE  44 18 471 A1  11/1995

OTHER PUBLICATIONS

International Search Report, Dated Nov. 23, 2004, Corresponding to PCT/DE2004/001281.

* cited by examiner

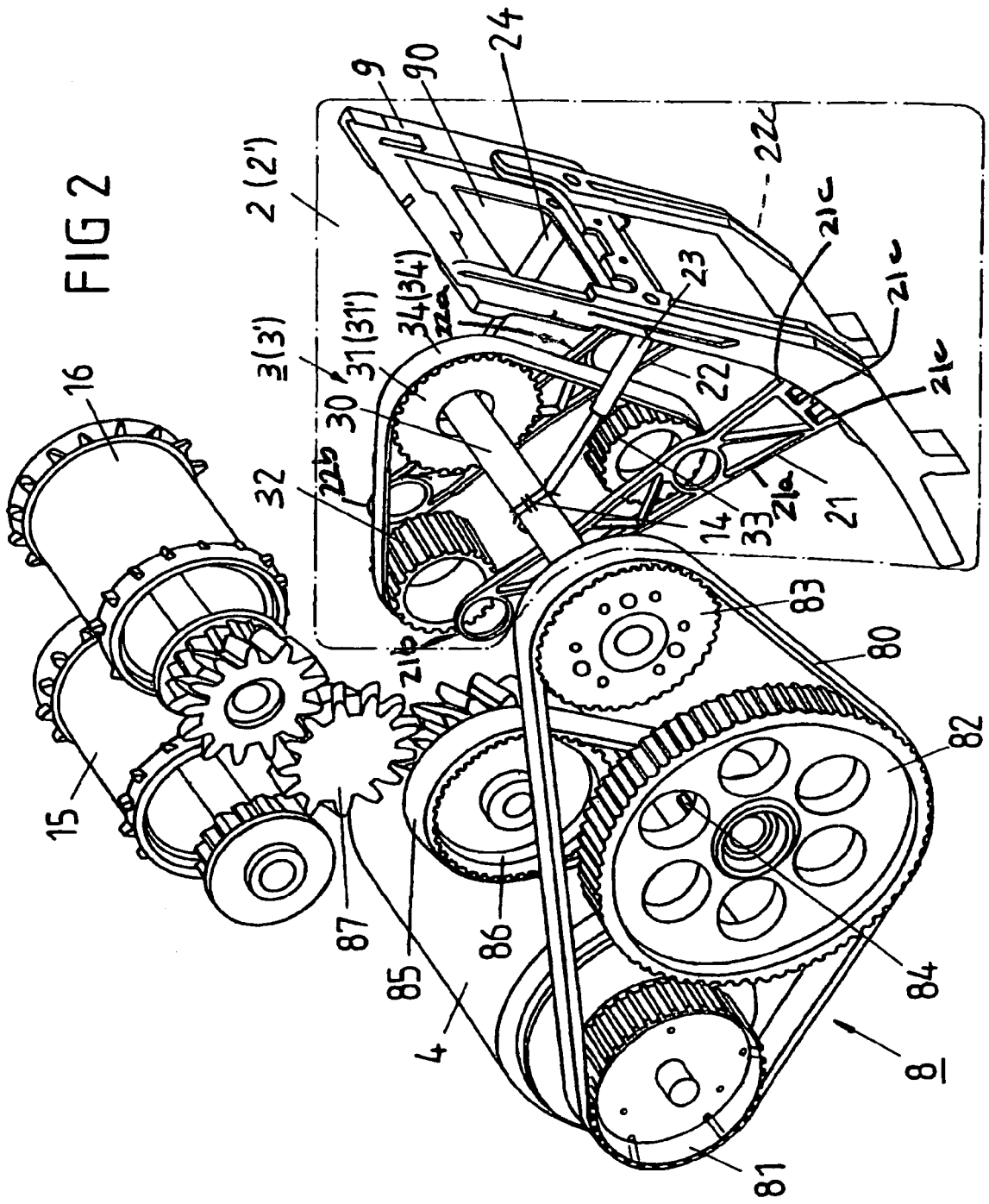

DEVICE FOR CONVEYING A MOTION PICTURE FILM

CROSS-REFERENCE TO A RELATED APPLICATION

This application is a National Phase patent application of International Application Number PCT/DE2004/001281, filed on Jun. 17, 2004, which claims priority of German Patent Application Number 103 27 771.4, filed on Jun. 17, 2003.

BACKGROUND

The invention relates to a device for conveying a motion picture film.

From German Patent Application No. DE 44 18 471 A1 a motion picture film recording camera is known for the exposure and intermittent conveyance of a motion picture film which is perforated along one or both sides. The unexposed motion picture film mounted in a film cassette connected to the camera housing of the motion picture film recording camera enters through an opening into the camera housing of the motion picture film recording camera and then leaves through this opening as exposed film. The feed of the motion picture film consists of one or more film conveying toothed reels which move the motion picture film continuously whilst a film feed mechanism moves the motion picture film intermittently past a picture window where it is covered in the transport phase through a rotating aperture and released for exposure during the exposure phase. In order to balance the continuous film movement and intermittent film movement film loops are formed on either side of the picture window.

The rotating aperture consists of an aperture disc which is either driven by an aperture motor which is coupled electrically to the film conveying or camera motor of the film drive so that the speeds of the aperture motor and of the camera motor run synchronously, or a direct mechanical coupling is provided where the rotating aperture is coupled to the camera motor through a film conveying gear.

The film feeding mechanism contains a film guide and a plunge gripper switch mechanism with a transport gripper which is moved by a gripper gearing so that its at least one transport gripper point during the intermittent conveyance of the motion picture film describes a closed crank loop where the transport gripper point first projects into the film perforation, implements the film transport step, moves back out of the film perforation and returns to its starting position. At the reversing points of the crank loop of the transport gripper the locking gripper point of a locking gripper correlated with the movement of the transport gripper and describing an oscillation movement engages in the film perforation, undertakes any possible correction of the alignment of the motion picture film in the film plane and secures the picture position of the motion picture film during the exposure of the film frame. After exposure of the film frame of the motion picture film the locking gripper point is again withdrawn so that the motion picture film is released for a further film transport step by the transport gripper.

In order to enable a greater exposure clearance during exposure of the motion picture film or a greater brightness performance during playback of the motion picture film the gripper gear contains two gear shafts moved in the same rotational direction of which one gear shaft has n-times the angular speed compared with the other gear shaft and the light sector of the aperture disc is either variable proportional to the angular speed or the diameter of the aperture disc is selectable inversely proportional to the angular speed and the centre point of the aperture is shifted relative to the picture window with decreasing diameter of the aperture disc.

It is known to move the motion picture film for exposure or projection of a film image depending on the desired image format either by three or four perforation holes of the single or double-sided film perforation during one film transport step and thus through different lateral conditions of the image formats and with film transport steps by three perforation holes to obtain a 25% greater utilisation of the film material used.

From German Patent Publication No. DE 690 24 048 T2 a toothed reel structural assembly is known for adapting a film projector to film transport steps by three or four perforation holes per film frame wherein the toothed reel connected to a drive shaft consists either of a cylindrical inner sleeve with teeth engaging in the film perforation or of a cylindrical outer sleeve likewise with teeth engaging in the film perforation and insertable on the cylindrical inner sleeve. With the same speed of drive shaft and the same toothed spacing but different diameter of the inner sleeve and outer sleeve four/three times as much motion picture film is transported with the outer sleeve than when using the inner sleeve with the outer sleeve removed so that the outer sleeve is designed suitable for film transport steps by four perforation holes per film frame and the inner sleeve for film transport steps about three perforation holes per film frame.

The known toothed reel structural assembly can indeed be used in a film projector which is equipped solely with toothed reels for the continuous and for the intermittent film transport with selectively three or four perforation holes per film picture. It cannot however be used for the following reasons, or at least not without limitations, for the film transport by selectively three or four perforation holes per film picture in a motion picture film recording camera, as in the motion picture film recording camera known from German Patent Application No. DE 44 18 471 A1 with film toothed reels for the continuous film conveyance and with a gripper feed mechanism for intermittent film conveyance.

With a film conveyance step of four perforation holes per film frame the transport gripper conveys the motion picture film during one revolution of the camera motor by four perforation holes each time whereby the unwinding toothed reel drawing the motion picture film out from the film cassette and the winding toothed reel conveying the motion picture film again into the film cassette execute one revolution about four toothed spacings each time. If the toothed reels each have 16 teeth then they consequently turn one quarter of the drive shaft of the camera motor driving the gripper feed mechanism. Compared to this the transport gripper with a film conveyance step about three perforation holes per film frame conveys the motion picture film three perforation holes for each revolution of the camera motor. To maintain constant film loops to compensate for the intermittent and continuous film conveyances it is necessary therefore in the case of a camera motor driving both the gripper feed mechanism and the toothed reels to change the translation ratio for driving the toothed reels so that these only turn by three teeth during one revolution of the gripper drive shaft and draw off a corresponding film length from the film cassette and feed it into the film cassette.

A use of the toothed reel structural assembly known from German Patent Publication No. DE 690 24 048 T2 in a motion picture film recording camera with a gripper feed mechanism would therefore make it necessary to re-equip the winding toothed reel and unwinding toothed reel or alternatively to replace the film transport gear for driving the toothed reels or by replacing gear elements such as belts and gear wheels to adapt it to the changed speed of the camera motor. For this however it would be necessary to dismantle the entire inner camera of the motion picture film recording camera or parts thereof, more particularly the camera electronics which involves considerable expense and additional costs.

The object of the present invention is therefore to adapt the device mentioned at the beginning to a film conveyance of three or four perforation holes per film frame without exchanging the film conveyance gearing or the winding and unwinding toothed reels or changing the geometry of the winding and unwinding toothed reels.

SUMMARY OF THE INVENTION

The solution according to the invention enables a film conveyance in a motion picture film recording camera with a gripper feed mechanism by three or four perforation holes per film frame without the need to exchange the film conveyance gearing or the winding and unwinding toothed reels or to change the geometry of the winding and unwinding toothed reels.

The solution according to the invention is based on the knowledge that to adapt a motion picture film recording camera with a gripper feed mechanism to an alternative film conveyance of three or four perforation holes per film transport step it is for structural design reasons much easier and technically more elegant only to exchange the gripper feed mechanism designed as a gripper block or the gripper gearing and to leave the film conveyance gearing including the camera motor and the winding and unwinding toothed reels unchanged, and instead to provide an electrical switch-over for the speed of the camera motor driving the gripper feed mechanism and the toothed reels or of the winding motor which drives the toothed reels and is connected electrically or electronically to the camera motor. Whereas the camera motor or the winding motor during a film conveyance of four perforation holes per film frame rotates at full speed which corresponds to the speed of the rotating aperture so that the winding and unwinding toothed reels move on by four perforation holes per revolution of the drive shaft of the camera motor, the camera motor or the winding motor turn with a film conveyance of three perforation holes per film frame only with three quarters of the speed of the rotating aperture so that the winding and unwinding toothed reels likewise move on by three perforation holes per revolution of the drive shaft of the camera motor. Since the transport gripper of the gripper feed mechanism also with a film conveyance by three perforation holes per film transport step must make one complete revolution of its crank loop when the rotating aperture makes one complete revolution, the gripper gearing must execute a 4:3 translation so that the transport gripper executes a complete crank loop again when the rotating aperture makes one complete revolution.

Consequently the device according to the invention is fitted for conveying a motion picture film which has at least one uniformly spaced row of perforations into which engages an unwinding toothed reel unwinding the motion picture film continuously from a film supply spool, a winding toothed reel winding the motion picture film continuously up onto a film winding spool, as well as a gripper feed mechanism which conveys the motion picture film along intermittently. To convey the motion picture film along by three or four perforation holes per film transport stage the winding toothed reel and unwinding toothed reel move the motion picture film by three or four perforation holes per each film transport step whilst different gripper feed mechanisms are provided and can be used to convey the motion picture film by three or four perforation holes per film transport step.

Whereas to convey the film by three or four perforation holes for each film transport step the winding and unwinding toothed reels are driven at different angular speeds, i.e. at different speeds for the winding motor which drives the winding and unwinding toothed reel, the geometry and/or kinematics of the gripper feed mechanism is adapted to the relevant film conveyance of three or four perforation holes per film transport step.

Preferably different gripper feed mechanisms for the film transport of three or four perforation holes per film transport step are provided as a so-called "gripper block" and are exchanged for example through a side camera door into the camera housing when changing the film transport step without having to undertake any further action in the camera mechanism.

Since there are different drive forms and drive combinations for driving the gripper feed mechanism, the winding and unwinding toothed reels as well as the rotational aperture, the solution according to the invention also allows different variations in design.

In a first variation of the invention in which a camera motor drives both the gripper feed mechanism and also the winding and unwinding toothed reels, the speed of the camera motor is changed for the conveyance of the motion picture film by three or four perforation holes per film transport step and a gripper feed mechanism is used which is adapted in its kinematics to the film transport by three or four perforation holes per film transport step.

In a second variation in which the camera motor drives the gripper feed mechanism whilst a winding motor drives the winding and unwinding toothed reel with which it is mounted normally together in the film cassette, only the speed of the winding motor is changed to the film transport by three or four perforation holes per film transport step whilst the speed of the camera motor remains unchanged and the gripper feed mechanism adapted to the film transport by three or four perforation holes per film transport is used as a gripper block in the camera mechanism.

Depending on the type of variation either the speed of the camera motor driving both the gripper feed mechanism and the winding and unwinding toothed reel or the speed of the winding motor driving the winding and unwinding toothed reel, and of the winding motors driving the winding toothed reel and unwinding toothed reel are switched over so that the winding toothed reel and unwinding toothed reel move the motion picture film with three or four perforation holes per film transport step.

The solution according to the invention is particularly suitable for a gripper feed mechanism with a gripper gearing and at least one transport gripper with transport gripper tips engaging in the perforation holes of the motion picture film and executing for film conveyance an oblong path which is closed per se in which they project into the perforation holes, move the motion picture film further on by three or four perforation holes each time and then move out of the perforation holes to return to their original position and whose translation ratio corresponds to a film conveyance by three or four perforation holes per film frame.

In this embodiment of the film feed mechanism as gripper gearing it is possible to undertake the change in the translation ratio of the gripper gearing for a film conveyance by three or four perforation holes per film frame by switching over the gripper gearing.

The connection of the first or second film feed mechanism is preferably carried out through a coupling to the film conveying motor or to a film transport gearing driven by the film conveying motor.

The connection of the relevant film feed mechanism to the film conveying motor or to the film transport gearing through a coupling makes it easier to exchange it for the alternative film conveyance by three or four perforation holes per film frame without having to make any great intervention into the film feed mechanism or into the mechanics of the motion picture film recording camera. More particularly the exchange can be made without dismantling the control electronics of the motion picture film recording camera and an existing coupling can be used to fold back the gripper feed mechanism when threading a motion picture film into the motion picture film recording camera.

In addition but not absolutely necessary the gripper feed mechanism can have a locking gripper coupled to the path of movement of the at least one transport gripper to project into a perforation hole of the motion picture film during the picture position of the film frames.

Basically the solution according to the invention is suitable both for a motion picture film recording camera and for a projector whereby the advantages of the solution according to the invention are particularly apparent when a gripper feed mechanism is connected to the film transport gear for driving the winding and unwinding toothed reel and a constant speed has to take place with a rotating aperture when adapted to the film conveyance by three or four perforation holes per film frame which is driven either by an aperture motor which is coupled electrically to the film conveying motor or which is connected mechanically through gearing to the film feed mechanism and is likewise driven by the film conveying motor.

A preferred embodiment of the invention relates to a motion picture film recording camera with a camera housing in which a rotating circular sector shape aperture disc is mounted in the recording beam path and covers the picture window during a film transport step of the film feed mechanism and releases the recording beam path to expose the film frame during the picture position of the motion picture film and a camera electronics connected at least in part to the camera housing, whereby the gripper gearing of the film feed mechanism contains a drive shaft connectable with the film conveying motor or film transport gearing with a first gripper toothed wheel whose diameter determines the film transport by three or four perforation holes per film picture, a transport gripper bracket whose one end supports the transport gripper tip or transport gripper tips and whose other end has a transport gripper joint which is connected to a second gripper gear wheel determining the gripper stroke of the transport gripper, and in the middle section of which is a crank joint which is connected to a third gripper gear wheel determining the movement of the transport gripper perpendicular to the plane of the motion picture film, and a toothed belt connecting the gripper gear wheels together.

In order to adapt the gripper gearing to the film conveyance by three or four perforation holes per film frame either the first gear wheel can be exchanged and in a first embodiment be set with a diameter corresponding to the film conveyance by three perforation holes per film frame and in a second embodiment with a diameter corresponding to the film conveyance by four perforation holes per film frame or the first gear wheel is divided in the axial direction and has a first gear wheel part with a first diameter corresponding to the film conveyance by three perforation holes per film frame and a second gear wheel part with a second diameter corresponding to the film conveyance by four perforation holes per film frame whereby the tooth spacings of the two gear wheel parts coincide with each other.

The solution according to the invention is however as an alternative to the gripper feed mechanism also suitable for a film feed mechanism which contains a film conveyance toothed reel which is according to the invention provided with a diameter adapted to the film conveyance by three or four perforation holes per film frame. Unlike in the prior art, when using the solution according to the invention it is therefore not necessary to also reset or modify the winding and unwinding toothed reel for a film conveyance by three or four perforation holes per film frame but only to carry out a speed adaption of the film conveying motor and to insert the film conveying toothed reel required into the film feed mechanism.

Instead of inserting the relevant film conveying toothed reel which is required into the film feed mechanism as an alternative it is possible to provide the relevant film feed mechanism with a film conveying toothed reel for conveying the motion picture film by three or four perforation holes per film frame whereby the film conveying toothed reel of the one film feed mechanism has a diameter adapted to the film conveyance by three perforation holes per film frame and the other film feed mechanism has a film conveying toothed reel with a diameter adapted to the film conveyance by four perforation holes per film frame.

BRIEF DESCRIPTION OF THE DRAWINGS

The idea on which the invention is based will now be described in further detail with reference to the embodiment illustrated in the drawings.

FIG. 2 is a diagrammatic perspective view of the film conveying device according to FIG. 1.

DETAILED DESCRIPTION

Figure 1:
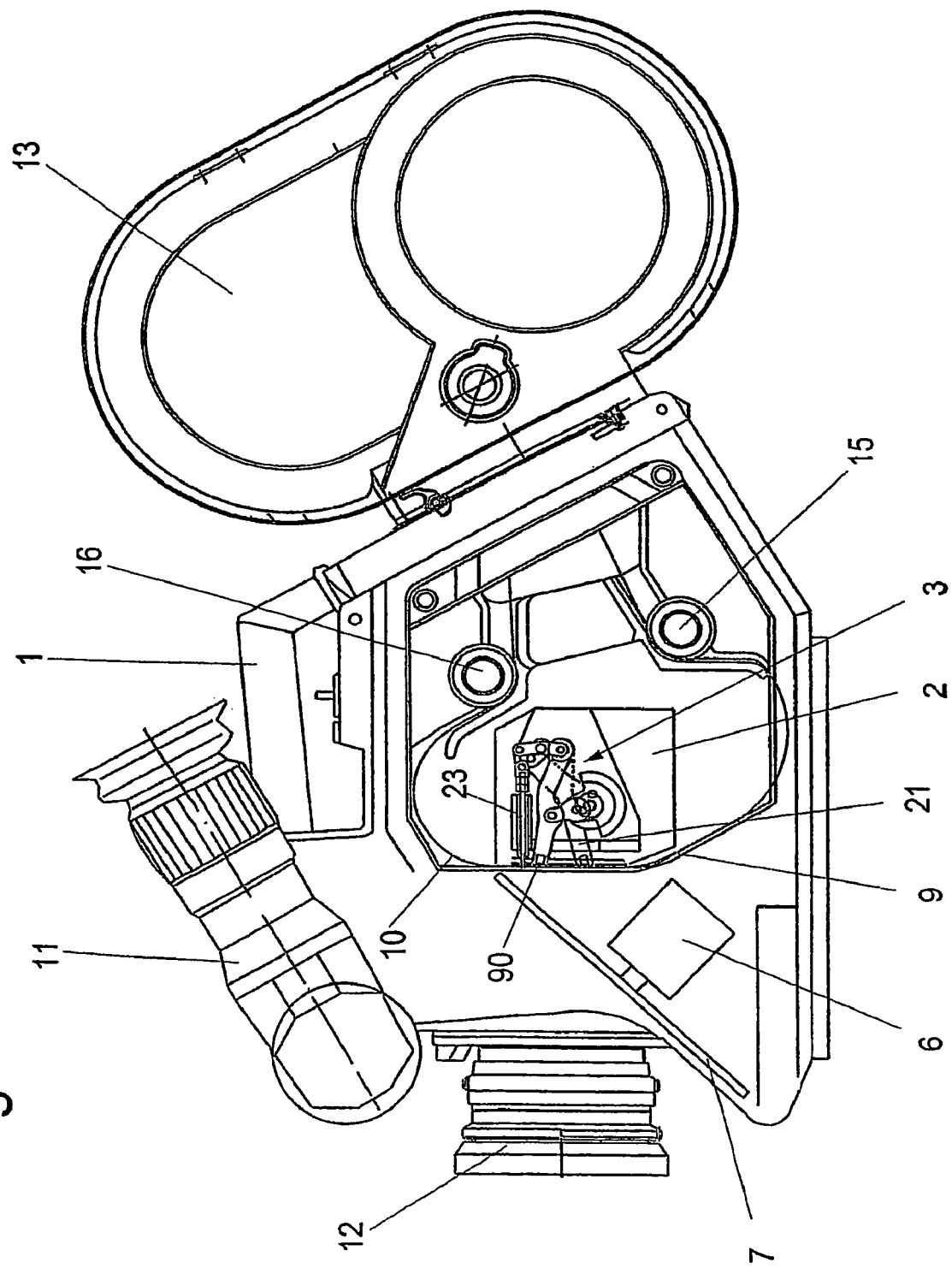
FIG. 1 is a side view of a motion picture film recording camera with a device for conveying a motion picture film with a winding and unwinding toothed reel and a gripper feed mechanism.

FIG. 1 shows a motion picture film recording camera with a camera housing 1, a viewfinder eyepiece 11, a camera lens 12 and a camera magazine 13 attached to the camera housing 1 and containing a film supply spool with unexposed motion picture film 10 and a film winding spool with the motion picture film which has been exposed by the motion picture film recording camera. The camera housing 1 which is shown partially opened contains a winding toothed reel 15 and an unwinding toothed reel 16 which unwinds the motion picture film 10 continuously from the film supply spool of the camera magazine 13 and winds it continuously onto the film winding spool of the camera magazine 13.

A film feed mechanism 2 (also referred to as a "gripper feed mechanism") driven by a camera motor (not shown in further detail) moves the motion picture film 10 intermittently past a film-gate 90 of a film guide 9 whereby the motion picture film 10 in the transport phase of the gripper feed mechanism is covered by a sector-shaped aperture disc of a rotating shutter 7 and is released through a sector-shaped cut-out section of the aperture disc of the rotating shutter 7 in order to expose a film image. The sector-shaped aperture disc of the rotating shutter 7 is driven by an mirror shutter motor 6 which is electrically coupled to the camera motor of the film feed mechanism 2 so that the speeds of the two motors run synchronously. Alternatively a mechanical coupling can be provided where the rotating shutter 7 is connected together with the film feed mechanism 2 through a film conveyance gearing to the camera motor.

In order to balance the continuous transport movement of the motion picture film 10 generated by the winding and unwinding toothed reels 15, 16 with the intermittent transport movement created through the gripper feed mechanism, film loops are formed on either side of the film-gate 90.

The film feed mechanism 2 serves to transport the motion picture film 10 and has for this purpose two pull-down claws 21, 22 (also referred to as "transport grippers") and where applicable to secure the picture position two registration pins 23, 24 associated with the pull-down claws 21, 22 to project into the perforation holes of the film perforations of the motion picture film 10. Furthermore the film feed mechanism 2 contains a movement gearing 3 with a drive shaft which is connected to the film transport gearing or to the camera motor. The pull-down claws 21, 22 and registration pins 23, 24 are formed as plunge grippers and have at their ends facing the motion picture film 10 transport gripper tips and locking gripper tips respectively which project alternately into the perforation holes of the film perforations of the motion picture film 10.

The pull-down claws 21, 22 execute with each film transport step a horizontal and vertical movement whereby the transport gripper tips or pull-down claw tips run through an elongated closed curve and at one end of the curve project into the perforation holes of the film perforations which they then leave at the other end of the curve so that the distance between the two reversal points determines the stroke length of the pull-down claws 21, 22 and their transport gripper tips and thus a film transport step.

Through the mechanical coupling of the pull-down claws 21, 22 and the registration pins 23, 24 the latter are located during a film transport step in which the motion picture film 10 is moved on farther by one film frame, outside of the film plane of the motion picture film 10 whilst the transport gripper tips have projected into the film perforations and move the motion picture film 10 corresponding to the predetermined stroke length between the upper and lower reversal points.

At the end of a film transport step the transport gripper tips leave the film perforations, the locking gripper tips project into the film perforation hole of the film perforations which aligns with the locking gripper tips and thereby guarantees a fixed picture position of the motion picture film 10 of which the part which is to be exposed is positioned in front of the film-gate 90 which is released during exposure of the motion picture film 10 through the rotating shutter 7 which is mounted in front of the film-gate 90.

The film guide 9 consists of two side film supports on which the edge of the motion picture film 10 slides along with the film perforations on both sides parallel to the side edges of the motion picture film 10.

The intermittent and continuous film conveyance, the arrangement of the winding and unwinding toothed reels as well as the drive of the rotating aperture can be different depending on the design of motion picture film recording camera.

Apart from a mechanical coupling of the rotating aperture with the camera motor driving the gripper feed mechanism the winding and unwinding toothed reels can also be coupled mechanically to the camera motor. As an alternative to this an arrangement is also possible of the winding and unwinding toothed reel in the film cassette and its drive by a winding motor coupled electronically to the camera motor for the winding and unwinding toothed reel or two winding motors coupled electronically to the camera motor for the winding toothed reel or unwinding toothed reel. Furthermore the separate drive of the rotating aperture already mentioned above by an aperture motor which is likewise coupled electronically to the camera motor is also possible.

The film conveying device illustrated in a perspective view in FIG. 2 has corresponding to the embodiment of a motion picture film recording camera illustrated in FIG. 1 a camera motor 4 which drives both the winding toothed reel 15 and the unwinding toothed reel 16 as well as the film feed mechanism 2 through a film transport gearing 8. The film transport gearing 8 contains a first film transport gear wheel 81 connected to the motor shaft of the camera motor 4 and through a film conveyance toothed belt 80 to a second film transport gear wheel 82 and a third film transport gear wheel 83 which drives the gripper drive shaft 30 of the movement gearing 3.

The second film transport gear wheel 82 is coupled to a further film transport gear wheel 84 of smaller diameter which is connected through a second film transport toothed belt 85 to a first film winding gear wheel 86 which drives the winding toothed reel 15 and unwinding toothed reel 16 through a second film winding gear wheel 87 as well as a connection which is not shown in further detail.

The film feed mechanism 2 is connected to the film guide 9 which has curved film skids for guiding the motion picture film and for its exposure on the film-gate 90. The film feed mechanism 2 contains a movement gearing 3, the two pull-down claws 21, 22 engaging in each one of the two rows of perforations of the motion picture film, as well as in this embodiment two registration pins 23, 24 which project in each one of the two rows of perforations of the motion picture film for the alignment and securing of the picture position during the film exposure of the motion picture film.

The pull-down claws 21, 22 contain a transport gripper bracket 21*a*, 22*a* which has at its one end a transport gripper joint 21*b*, 22*b* and at its other end three transport gripper tips 21c, 22c which for the film conveyance describe an elongated closed crank loop where they first project into three adjoining perforation holes of the film perforations, execute a film transport step, leave the film perforation again and return to their original position. The transport gripper joint thereby determines the movement of the transport gripper tips perpendicular to the plane of the motion picture film and a crank joint mounted between the transport gripper joint and the transport gripper tips determines the transport stroke of the transport gripper tips in the conveyance direction of the motion picture film.

The registration pins 23, 24 are connected to the movement gearing 3 through a control element (not shown in further detail) so that they implement an oscillating movement perpendicular to the film plane and thereby each project with their locking gripper tips into a perforation hole of the film perforations in alternating play with the transport gripper tips.

The movement gearing 3 has the gripper drive shaft 30 which is connected to the third film transport gear wheel 83 of the film transport gearing 8 and which supports a first claw gear wheel 31 which is connected through a claw toothed belt 34 to a second claw gear wheel 32 which is coupled to the transport gripper joints and thus determines the movement of the pull-down claws 21, 22 perpendicular to the plane of the motion picture film, as well as is connected to a third claw gear wheel 33 which is coupled to the crank joint and consequently determines the transport stroke of the transport gripper tips in the transport direction of the motion picture film.

The gripper drive shaft 30 can be made divided and have a coupling 14 which is designed for example corresponding to the coupling known from German Patent Application No. DE 42 05 411 A1. Through the arrangement of the coupling 14 or through a gripper drive shaft 30 connectable in a different way to the third film transport gear wheel 83 of the film transport gearing 8 the film feed mechanism 2 can be simply exchanged for a film feed mechanism 2' and thus with an unchanged arrangement of the camera motor 4 of the film transport gearing 8 and winding and unwinding toothed reels 15,16 can be adapted to a film conveyance by either three or four perforation holes per film frame or film transport step.

Apart from a complete exchange of the film feed mechanism 2 designed as a gripper block for a film feed mechanism 2' a part exchange of the movement gearing 3 for a movement gearing 3' with the pull-down claws 21, 22 and registration pins 23, 24 by retaining the film guide 9 is also possible.

If in place of the film feed mechanism 2 with transport grippers illustrated in FIG. 2 a film transport toothed reel is used then this can either be driven through a gearing corresponding to the movement gearing 3 with a different translation ratio or a film conveyance toothed reel of a smaller diameter is used for a film conveyance by three perforation holes per film frame or a film conveyance toothed reel of larger diameter is used for a film conveyance by four perforation holes per film frame.

Different embodiments of the solution according to the invention are shown as block circuit diagrams in FIGS. 3a, 3b, 4a, 4b and 5a, 5b.

Figure 3A:
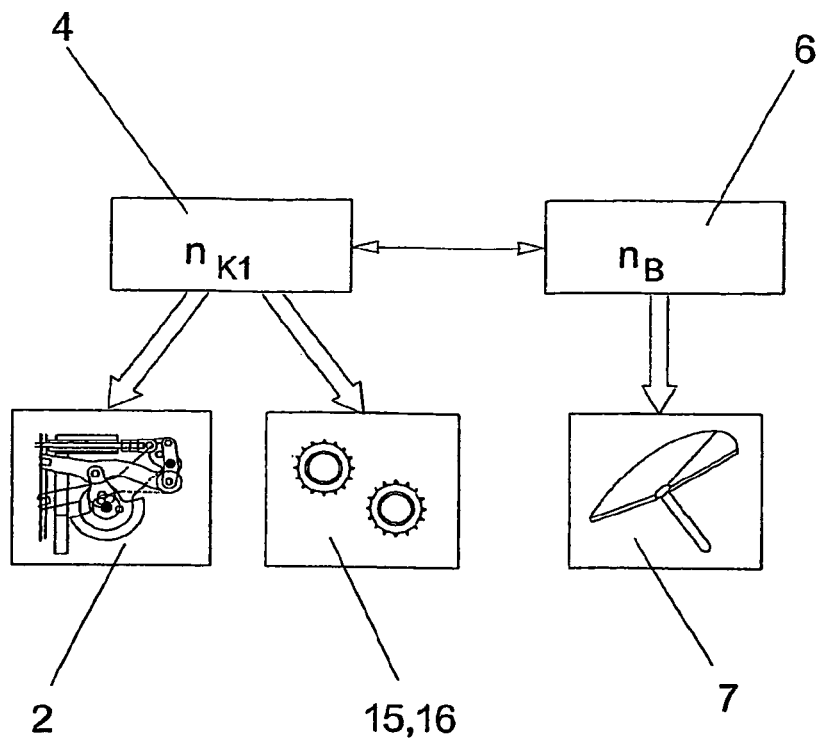
FIG. 3a shows a first block circuit diagram for explaining the film conveyance with three and four perforation holes respectively per film transport step with a camera motor driving the gripper feed mechanism and the winding and unwinding toothed reels, and an aperture motor coupled electronically to the camera motor for driving the rotating aperture.
Figure 3B:
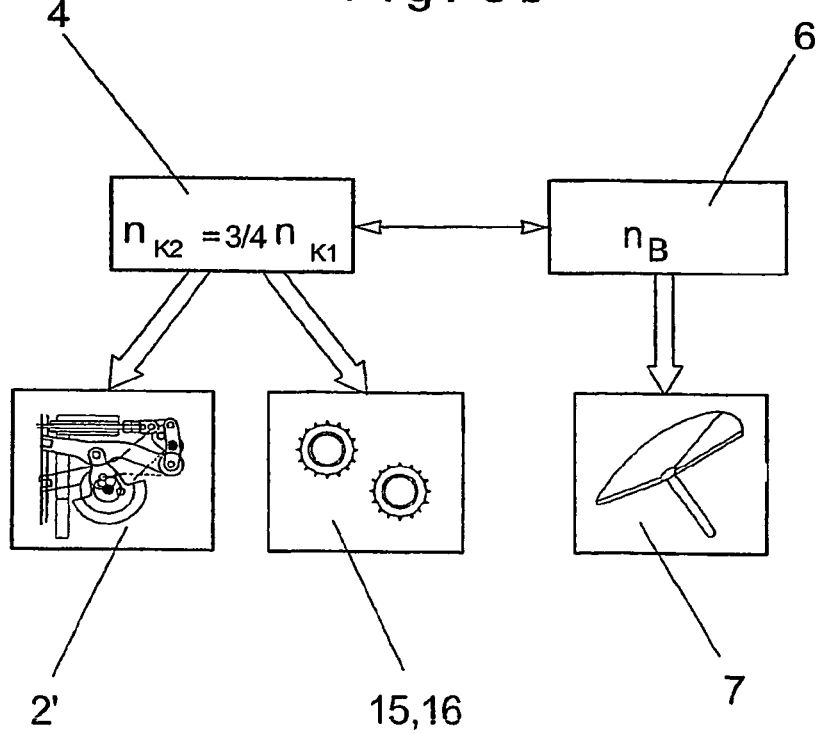
FIG. 3b shows a second block circuit diagram for explaining the film conveyance with three and four perforation holes respectively per film transport step with a camera motor driving the gripper feed mechanism and the winding and unwinding toothed reels, and an aperture motor coupled electronically to the camera motor for driving the rotating aperture.

In a first variation FIGS. 3a and 3b show a block circuit diagram of the mechanically coupled drive of the film feed mechanism 2 illustrated in perspective view in FIG. 2 and of the winding and unwinding toothed reels 15, 16 by the camera motor 4, and the drive which is separated therefrom of the rotating shutter 7 by an mirror shutter motor 6 coupled electronically to the camera motor 4.

With the film conveyance of the motion picture film with four perforation holes per film transport step shown diagrammatically in FIG. 3a the camera motor 4 drives the film feed mechanism 2 which is adapted to the film transport by four perforation holes per film transport step and the winding and unwinding toothed reels 15, 16 with the speed $n_{K1}$ so that the winding and unwinding toothed reels 15, 16 rotate the motion picture film by four perforation holes per film transport step during one revolution of the gripper feed mechanism. The speed $n_B$ of the mirror shutter motor 6 corresponds to the speed $n_{K1}$ of the camera motor taking into account the translation up or down of the film transport gearing 8 connected to the camera motor 4 according to FIG. 2.

With a film conveyance illustrated diagrammatically in FIG. 3b by three perforation holes per film transport step the camera motor 4 drives the film feed mechanism 2' which is adapted to the film conveyance by three perforation holes per film transport step and the winding and unwinding toothed reels 15, 16 with a speed $n_{K2}$ which amounts to ¾ of the speed $n_{K1}$ for the film transport by three perforation holes per film transport step. The winding and unwinding toothed reels 15, 16 are thereby only turned per revolution by three perforation holes of the motion picture film whilst the film feed mechanism 2' executes one complete revolution when the rotating shutter 7 likewise completes one complete revolution. The film feed mechanism 2' is translated with 4:3 compared with the film feed mechanism 2 and consequently leads to a complete revolution with a complete revolution of the rotating shutter 7 which is driven by the mirror shutter motor 6 which is coupled electronically to the camera motor 4.

Figure 4A:
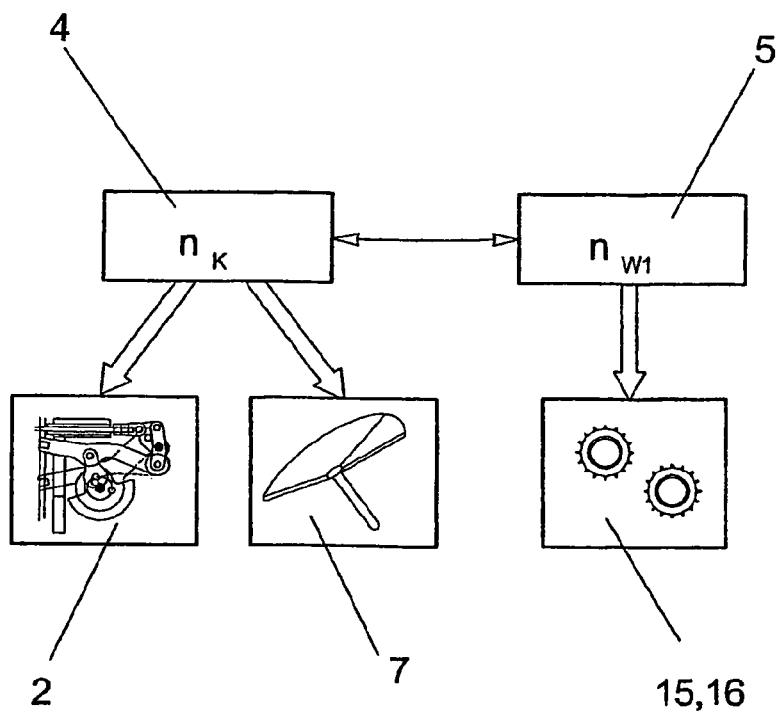
FIG. 4a shows a first block circuit diagram for explaining the film conveyance with three or four perforation holes per film transport step with a camera motor driving the gripper feed mechanism and the rotating aperture, and one or two winding motors driving the winding and unwinding toothed reels.
Figure 4B:
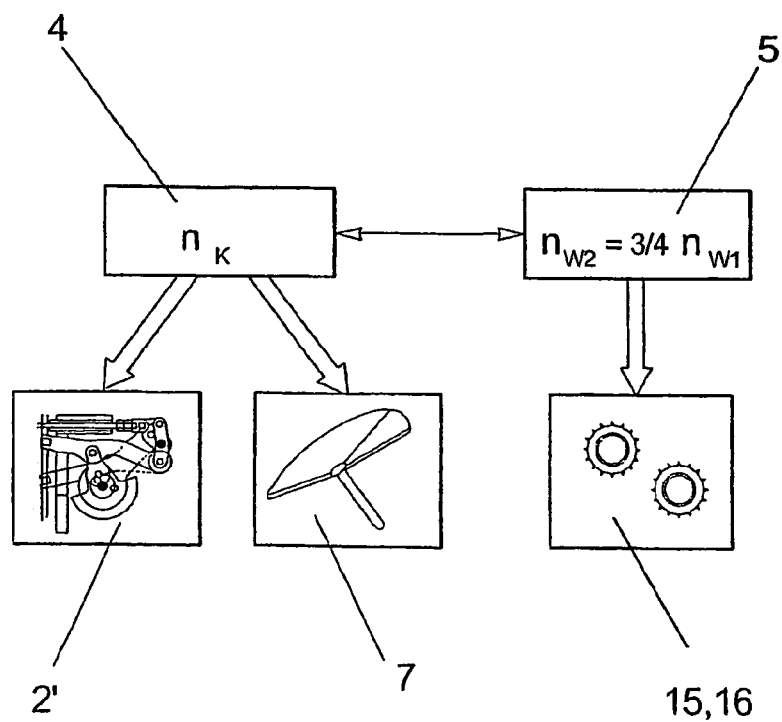
FIG. 4b shows a second block circuit diagram for explaining the film conveyance with three or four perforation holes per film transport step with a camera motor driving the gripper feed mechanism and the rotating aperture, and one or two winding motors driving the winding and unwinding toothed reels.

FIGS. 4a and 4b show in a block circuit diagram a variation in which the camera motor 4 drives both the film feed mechanism 2, 2' and also the rotating shutter 7 whilst a film winding motor driving the winding and unwinding toothed reels 15, 16 and winding motors each driving the winding toothed reel 15 and the unwinding toothed reel 16 is/are coupled electronically to the camera motor 4.

In the embodiment according to FIG. 4a with a film transport by four perforation holes per film transport step the camera motor 4 is operated with a speed $n_K$ when using a film feed mechanism 2 adapted to the film conveyance by four perforation holes per film transport step, whilst the film winding motor 5 drives with the speed $n_{w1}$ the winding and unwinding toothed reels 15, 16 which convey the motion picture film with each film transport step by four perforation holes.

With a film transport diagrammatically illustrated in FIG. 4b by three perforation holes per film transport step the camera motor 4 is operated with the same speed $n_K$ for driving the film feed mechanism 2' adapted to the film transport by three perforation holes per film transport step, and the rotating shutter 7. On the other hand the film winding motor 5 rotates at a speed $n_{W2}$ which amounts to ¾ of the speed $n_{W1}$ so that the winding and unwinding toothed reel 15, 16 are turned on by three perforation holes per film transport step whilst the film feed mechanism 2' and the rotating shutter 7 execute one complete revolution.

Figure 5A:
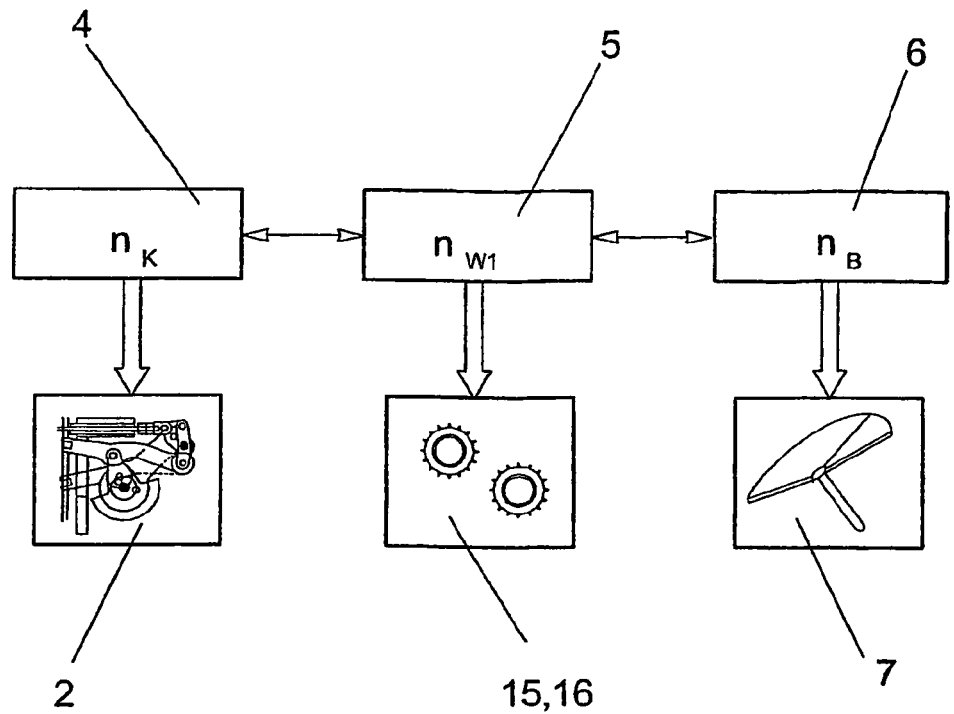
FIG. 5a shows a first block circuit diagram for explaining the film conveyance with three or four perforation holes per film transport step with camera motor, winding motor and aperture motor coupled together electronically.
Figure 5B:
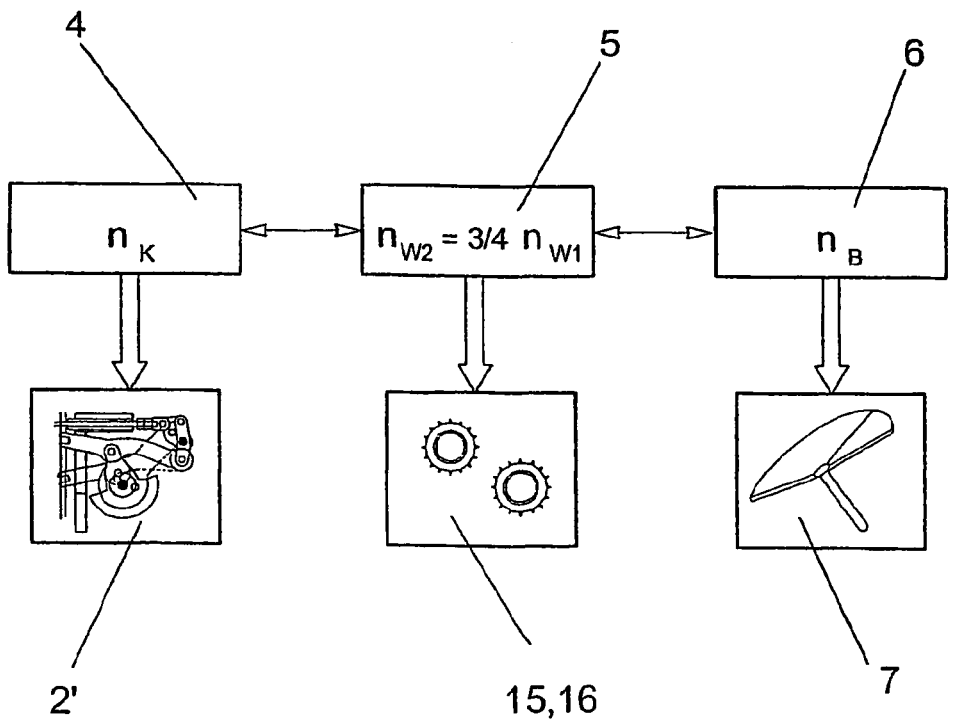
FIG. 5*b* shows a second block circuit diagram for explaining the film conveyance with three or four perforation holes per film transport step with camera motor, winding motor and aperture motor coupled together electronically.

FIGS. 5a and 5b show a block circuit diagram of one embodiment each with their own drive for the film feed mechanism 2, 2', the winding and unwinding toothed reel 15, 16 and the rotating shutter 7 by a camera motor 4, a film winding motor 5 and an mirror shutter motor 6 which are coupled electronically together.

With a film transport step illustrated diagrammatically in FIG. 5a of four perforation holes the camera motor is operated with a speed $n_k$ and drives a film feed mechanism 2 which is adapted to the film transport step of four perforation holes. The film winding motor 5 drives the winding and unwinding toothed reel 15,16 at a speed $n_{W1}$ so that these move the motion picture film on further with each film transport step by four perforation holes. The mirror shutter motor 6 is operated at a speed $n_B$ at which the rotating shutter 7 makes a complete revolution when the film feed mechanism 2 likewise has run through a complete crank loop and the winding and unwinding toothed reels 15, 16 have move the motion picture film on by four perforation holes.

With a film transport step likewise illustrated diagrammatically in FIG. 5b of three perforation holes the camera motor 4 is likewise operated at a speed $n_K$ and drives a film feed mechanism 2' which is adapted to the film transport by three perforation holes per film transport step so that this runs through a complete crank loop when the rotating shutter 7 driven by the mirror shutter motor 6 at a speed $n_B$ executes a complete revolution. On the other hand the film winding motor 5 is operated with a speed $n_{W2}$ which amounts to ¾ the speed $n_{W1}$ so that the winding and unwinding toothed reels 15, 16 move the motion picture film 10 on by three perforation holes per film transport step.

The invention claimed is:

1. A film transport device for a motion picture film which has a row of uniformly spaced perforations which are engaged by an unwinding toothed reel which unwinds the motion picture film continuously from a film supply spool, a winding toothed reel which winds up the motion picture film continuously onto a winding spool, and a gripper feed mechanism which conveys the motion picture film intermittently, said winding toothed reel and said unwinding toothed reel moving the motion picture film with one of three and four perforation holes per film transport step, wherein a film feed mechanism of a plurality of different film feed mechanisms is usable for conveying the motion picture film by one of three and four perforation holes per film transport step.

2. The device according to claim 1, wherein said different film feed mechanisms are interchangeable.

3. The device according to claim 1, wherein a camera motor drives the film feed mechanism and the winding and unwinding toothed reels whose speed is changeable for conveying the motion picture film by one of three and four perforation holes per film transport step.

4. The device according to claim 1, wherein a camera motor drives the film feed mechanism, wherein the winding and unwinding toothed reels have a variable speed and are connected to at least one film winding motor which is coupled electrically or electronically to the camera motor for conveying the motion picture film by one of three and four perforation holes per film transport step.

5. The device according to claim 3, wherein the speed of one of the camera motor and of the at least one film winding motor is adjustable so that the winding toothed reel and the unwinding toothed reel move the motion picture film with one of three and four perforation holes per film transport step.

6. The device according to claim 1, further comprising a film feed mechanism having a movement gearing and at least one pull-down claw with transport gripper tips engaging in the perforation holes of the motion picture film, wherein the transport gripper tips convey the film executing an elongated closed path curve in which said transport gripper tips project into the perforation holes, wherein said transport gripper tips convey the motion picture film further on one of by three and four perforation holes each time and then move out of the perforation holes to return to their starting position, and wherein the translation ratio of the movement gearing corresponds to a film conveyance by one of three and four perforation holes per film transport step.

7. The device according to claim 6, wherein the translation ratio of the movement gearing is reversible.

8. The device according to claim 6, wherein one of the plurality of film feed mechanisms is connectable through a coupling to one of the camera motor and to a film transport gearing driven by the camera motor.

9. The device according to claim 6, wherein the movement gearing contains a drive shaft connectable to one of the camera motor and film transport gearing and comprises:
a first claw gear wheel whose diameter determines the film conveyance by one of three and four perforation holes per film transport step;
a transport gripper bracket whose one end supports at least one of the transport gripper tips and whose other end has a transport gripper joint which is connected to a second claw gear wheel for the movement of the transport gripper tips perpendicular to a plane of the motion picture films, wherein a center section of said bracket there is a crank joint which is connected to a third claw gear wheel determining the transport stroke of the transport gripper tips; and
a toothed belt connecting the claw gear wheels together, wherein the first claw gear wheel is exchangeable and in a first embodiment has a diameter corresponding to the film transport by three perforation holes per film transport step and in a second embodiment has a diameter corresponding to the film transport by four perforation holes per film transport step.

10. The device according to claim 1, wherein the film feed mechanism contains a film transport toothed reel with a diameter adapted to allow for the film conveyance by one of three and four perforation holes per film transport step.

11. The device according to claim 1, wherein a rotating circular sector shaped shutter disc is mounted in the recording beam path of a motion picture film recording camera and is coupled to the conveyance of the motion picture film and is driven independently of a film transport step by one of three and four perforation holes, wherein an aperture disc covers a film-gate during a film transport step of the film feed mechanism and releases the recording beam path for the exposure of a film frame during the picture position of the motion picture film.

12. The device according to claim 11, wherein the shutter disc and the gripper film feed mechanism are connected to the camera motor.

13. The device according to claim 11, wherein the shutter disc is connected to the drive shaft of a mirror shutter motor coupled electronically to the camera motor and to the winding motor.

* * * * *